Oct. 3, 1967      G. N. JORGENSEN      3,345,022
BUS DUCT HANGER
Filed Oct. 23, 1965
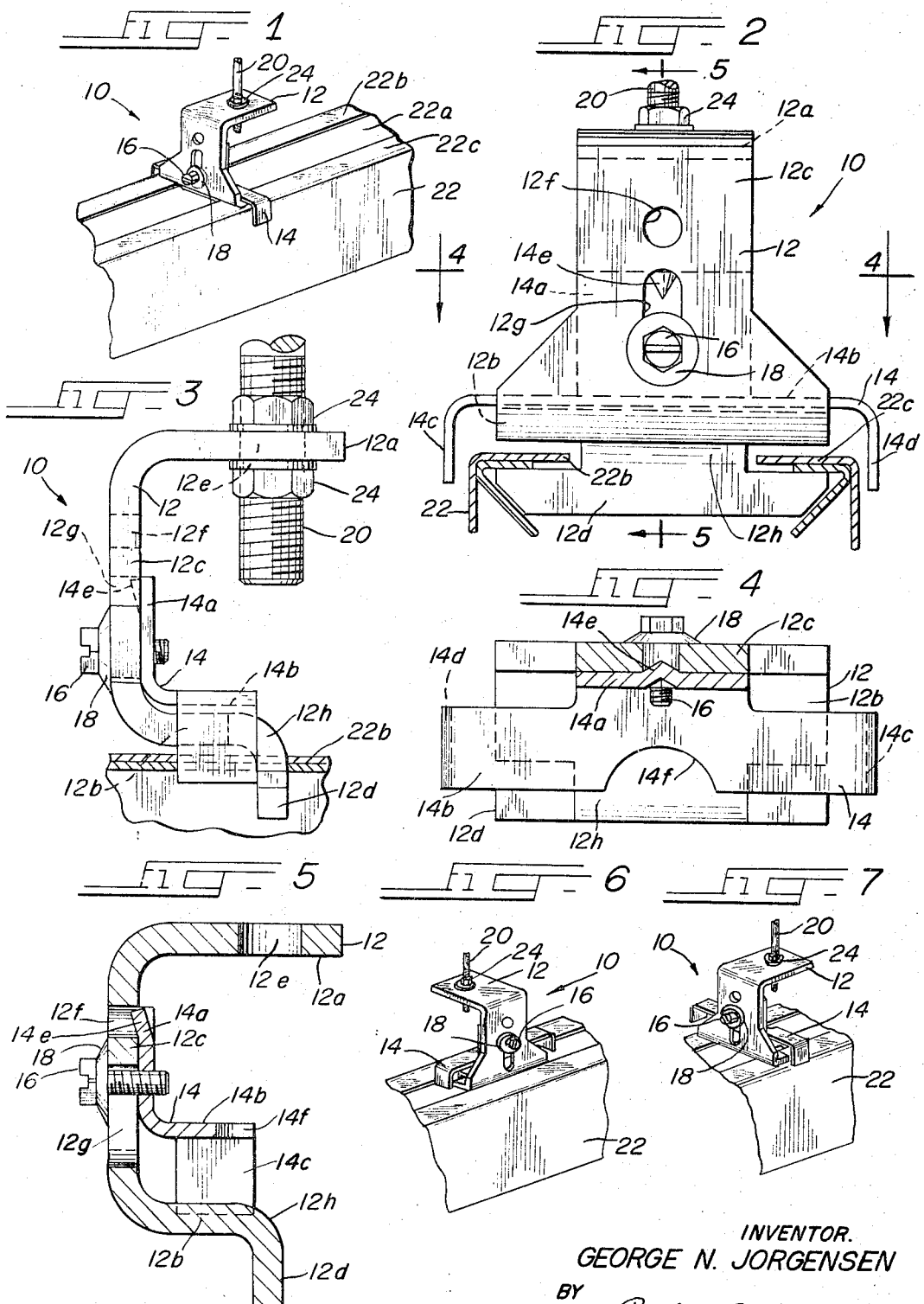
INVENTOR.
GEORGE N. JORGENSEN
BY Paul J. Rose
ATTY.

United States Patent Office 3,345,022
Patented Oct. 3, 1967

3,345,022
BUS DUCT HANGER
George N. Jorgensen, Lexington, Ky., assignor to Square D Company, Park Ridge, Ill., a corporation of Michigan
Filed Oct. 23, 1965, Ser. No. 503,252
10 Claims. (Cl. 248—59)

ABSTRACT OF THE DISCLOSURE

The hanger includes a body member, a locking member for locking a bus duct housing to the body member, and fastening means normally maintaining the locking member in assembled relationship with the body member. The locking member is shiftable between locking and unlocking positions without being disassembled from the body member. The connection between the body member and a bus duct housing is directly beneath a drop rod to which the body member is secured.

---

This invention relates to bus duct hangers.

An object of the invention is to provide an improved bus duct hanger in which the connection to a bus duct is directly beneath a drop rod for the hanger.

Another object is to provide a bus duct hanger in which a locking member for securing the hanger to a bus duct is held captive on the hanger by only one screw and does not need to be disassembled from the hanger for installation of a bus duct thereon.

In the drawings:

FIG. 1 is a perspective view of a bus duct hanger constructed in accordance with the invention, showing a portion of a drop rod for the hanger and a portion of a bus duct installed on the hanger;

FIG. 2 is an end elevational view of the hanger of FIG. 1 and a fragmentary sectional portion of the bus duct housing;

FIG. 3 is a side elevational view of the hanger of FIG. 1 and a fragmentary sectional portion of the bus duct housing;

FIG. 4 is a sectional view taken generally along the line 4—4 of FIG. 2 and omitting the bus duct housing;

FIG. 5 is a sectional view taken generally along the line 5—5 of FIG. 2 but showing the locking member of the hanger in raised position and omitting the drop rod and bus duct housing; and FIGS. 6 and 7 are perspective views showing various steps in the installation of bus duct on the hanger of FIG. 1.

A bus duct hanger 10 constructed in accordance with the invention includes a hanger body member 12, a locking member 14, and a screw 16 provided with a Belleville washer 18 or other suitable lock washer. The hanger 10 is adapted to be installed on a drop rod 20 and to have a bus duct 22 suspended therefrom.

The body member 12 is formed from flat stock and includes an upper horizontal attaching portion 12a, a lower horizontal portion 12b, an upper vertical portion 12c connecting the portions 12a and 12b, and a lower vertical hook portion 12d connected to the portion 12b adjacent the end thereof opposite the portion 12c. The portions 12a and 12b extend in the same direction from the portion 12c, the portion 12a being longer, and the portions 12c and 12d extend in opposite directions from the portion 12b.

The portion 12a is provided with a hole 12e for reception of the drop rod 20. A pair of nuts 24 may be used to secure the hanger 10 in place on the drop rod 20, as best shown in FIG. 3. The portion 12c is provided with an upper hole 12f for a purpose to be described and with a lower vertically elongated slot 12g which receives the screw 16.

The locking member 14 is formed from flat stock and includes a vertical portion 14a, an elongated horizontal portion 14b having one of its longer edge portions connected centrally thereof to the lower part of the portion 14a, and a pair of generally parallel restraining portions 14c and 14d respectively connected to opposite end portions of the portion 14b and extending downwardly therefrom. The portion 14a is provided with a threaded hole in which the screw 16 is received. The central portion of the upper part of the portion 14a is dented to provide a detent portion 14e. The edge portion of the portion 14b opposite the portion 14a is cut away centrally thereof as shown at 14f in FIGS. 4 and 5 to insure against interference with the drop rod 20.

The housing of the bus duct 22 has a predetermined width, and the restraining portions 14c and 14d are spaced apart sufficiently to receive the top portion of the bus duct 22. Further, the top of the housing of the bus duct 22 is provided with a longitudinal opening 22a (FIG. 1) defined by inwardly extending flange portions 22b and 22c. The portions 12b and 12d are generally wider than the opening 22a, but are connected by a curved portion 12h which is narrower than the opening 22a.

The locking member 14 has two positions with respect to the hanger body member 12. As furnished, the locking member 14 is secured by the screw 16 in an upper or raised position, as shown in FIG. 5, with the screw 16 in the upper portion of the slot 12g and the detent portion 14e projecting into the hole 12f.

In the installation of a bus duct 22 on the hanger 10, the hanger is turned on the drop rod 20 to the position shown in FIG. 6 with respect to the bus duct 22. In this position, the widest portion of the portion 12d extends longitudinally of the bus duct 22, and the bus duct 22 may be raised to insert the portion 12d through the opening 22a and dispose the flange portions 22b and 22c above the portion 12d. The hanger 10 may then be turned ninety degrees to the position shown in FIG. 7 to dispose opposite end portions of the portion 12d vertically beneath the flange portions 22b and 22c, as best shown in FIG. 2. The flange portions 22b and 22c are then trapped between the portions 12b and 12d. The final steps are the loosening of the screw 16, the lowering of the locking member 14 into a locking position as shown in FIGS. 1, 2, and 3, and the retightening of the screw 16 to dispose the detent portion 14e in the slot 12g. Any tendency of the hanger 10 to turn on the drop rod 20 so as to allow the bus duct 22 to slip off the portion 12d is then prevented by engagement of the portions 14c and 14d respectively with outer surfaces of the opposite sides of the housing of the bus duct 22.

It will be noted that only one screw 16 is required to secure the locking member 14 in either of its desired positions with respect to the body member 12, and that the locking member 14 need not be disassembled from the body member 12 in order to install a bus duct 22 on the hanger 10. Further, as best shown in FIGS. 3 and 5, the portion 12d which supports the bus duct 22 is directly beneath the hole 12e through which the drop rod 20 of a mounted hanger 10 extends, and thus the bus duct 22 does not tend to cock the hanger 10 and bend the drop rod 20.

Terms used herein which have directional connotations are descriptive of the hanger 10 when it is in use.

I claim:

1. A bus duct hanger comprising a hanger body member, a locking member, and fastening means normally maintaining said locking member in assembled relationship with said hanger body member in either of two upper and lower positions relative thereto, said hanger body member being adapted to receive a bus duct housing when said locking member is in said upper relative position, said locking member being adapted to lock a bus duct housing on said hanger body member when said locking member is in said lower relative position, said locking member being shiftable between said two relative positions upon loosening of said fastening means without disassembling said locking member from said hanger body member, one of said members being provided with a vertically elongated slot and the other of said members being provided with a hole, and said fastening means comprising a single screw extending through said slot and hole.

2. A bus duct hanger as claimed in claim 1, wherein said hanger body member is provided with a vertically elongated slot and said locking member is provided with a hole, and said fastening means comprises a single screw extending through said slot and hole.

3. A bus duct hanger as claimed in claim 1, wherein said hole is threaded and said screw threadedly engages said threaded hole.

4. A bus duct hanger as claimed in claim 2, wherein said hole is threaded and said screw threadedly engages said threaded hole.

5. A bus duct hanger as claimed in claim 1, wherein said hanger body member is formed from flat stock and includes an upper generally horizontally attaching portion having a hole therethrough for reception of a drop rod, a lower generally horizontal portion, an upper generally vertical portion connecting said horizontal portions, said horizontal portions extending in the same direction from said upper vertical portion, and a lower generally vertical hook portion connected to said lower horizontal portion adjacent the end thereof opposite said upper vertical portion, said lower horizontal portion being shorter than said upper horizontal attaching portion so as to dispose said vertical hook portion substantially directly vertically beneath said hole for said drop rod.

6. A bus duct hanger as claimed in claim 5, wherein said locking member is formed from flat stock and includes a generally vertical portion normally secured to said upper vertical portion of said hanger body member in either of said two relative positions, an elongated generally horizontal portion having one of its longer edge portions connected centrally thereof to the lower part of said vertical portion of said locking member, and a pair of restraining portions respectively connected to opposite end portions of said elongated horizontal portion and extending downwardly therefrom, said restraining portions being spaced apart sufficiently to receive a bus duct housing therebetween and projecting past said lower horizontal portion of said hanger body member when said locking member is in said lower relative position.

7. A bus duct hanger as claimed in claim 6, wherein one of said members is provided with a vertically elongated slot through which said fastening means extends and the other of said members is provided with a hole through which said fastening means extends, said one member also having a hole vertically aligned with said slot, and said other member having a detent portion received in said vertically aligned hole in said one member when said locking member is in one of said relative positions and received in said slot when said locking member is in the other of said relative positions.

8. A bus duct hanger as claimed in claim 7, wherein said hole in said other member is threaded and said fastening means is a screw threadedly engaging said threaded hole.

9. A bus duct hanger as claimed in claim 6, wherein said hanger body member is provided with a vertically elongated slot through which said fastening means extends and with a hole vertically aligned with said slot, and said locking member is provided with a hole through which said fastening means extends and with a detent portion received in said vertically aligned hole in said hanger body member when said locking member is in one of said relative positions and received in said slot when said locking member is in the other of said relative positions.

10. A bus duct hanger as claimed in claim 9, wherein said hole in said locking member is threaded and said fastening means is a screw threadedly engaging said threaded hole.

References Cited

UNITED STATES PATENTS

| | | | |
|---|---|---|---|
| 552,951 | 1/1896 | Bower et al. | 248—70 |
| 2,736,528 | 2/1956 | Brock | 248—317 |
| 3,136,841 | 6/1964 | Stiner | 248—58 X |
| 3,229,027 | 1/1966 | Kindorf | 174—48 X |

ROY D. FRAZIER, *Primary Examiner.*

J. F. FOSS, *Assistant Examiner.*